United States Patent [19]

Winter

[11] 4,226,135
[45] Oct. 7, 1980

[54] LOAD-SPLITTING TRANSMISSION

[75] Inventor: August Winter, Friedrichshafen, Fed. Rep. of Germany

[73] Assignee: Zahnradfabrik Friedrichshafen Aktiengesellschaft, Friedrichshafen, Fed. Rep. of Germany

[21] Appl. No.: 926,288

[22] Filed: Jul. 20, 1978

[30] Foreign Application Priority Data

Aug. 16, 1977 [DE] Fed. Rep. of Germany ....... 2736929

[51] Int. Cl.² .................... F16H 3/08; F16H 37/10
[52] U.S. Cl. .................................. 74/330; 74/331; 74/360
[58] Field of Search .............. 74/360, 357, 358, 359, 74/329, 330, 331

[56] References Cited

U.S. PATENT DOCUMENTS

| | | | |
|---|---|---|---|
| 2,867,126 | 1/1959 | Bolster | 74/360 |
| 2,972,899 | 2/1961 | Wiggermann | 74/360 |
| 3,600,963 | 8/1971 | Portmann et al. | 74/359 X |
| 3,886,815 | 6/1975 | Eastwood | 74/360 |
| 3,897,699 | 8/1975 | Hoyer | 74/360 |
| 4,038,882 | 8/1977 | Keller | 74/360 |
| 4,106,358 | 8/1978 | Morrison | 74/331 |

Primary Examiner—George H. Krizmanich
Attorney, Agent, or Firm—Karl F. Ross

[57] ABSTRACT

A load-splitting transmission has a housing in which are journaled about fixed axes a central shaft and two outer shafts. One end of the central shaft is connected to the drive and the other end of the central shaft, which is rotatable relative to the drive end, is connected to a load. The two outer shafts are each constituted as an outer tube shaft extending a part of the length of the respective outer shaft and a central torsion or core shaft extending the full length. A plurality of sets of gears are provided, each including a central gear on the central shaft and an outer gear on each of the outer shafts and meshing with the central gear. Synchromesh clutches can connect the various gears to the respective shafts for shifting. In addition at least some of the gears may be limitedly angularly displaceable on the respective shafts to compensate for misalignment and prevent gear clashing.

10 Claims, 3 Drawing Figures

LOAD-SPLITTING TRANSMISSION

FIELD OF THE INVENTION

The present invention relates to a multispeed transmission. More particularly this invention concerns such a transmission usable in a motor vehicle and of the so-called load-splitting type.

BACKGROUND OF THE INVENTION

A load-splitting transmission normally has a central shaft having relatively rotatable input and output ends, and a pair of outer or satellite shafts flanking this central shaft. Torque is transmitted from the input end of the central shaft through appropriate gearing either to both of the satellite shafts, or to one of the shafts and thence through further gearing to the other shaft. Gearing is provided for synchronous rotation of both of the outer shafts which are in turn connected through another set of gears to the output end of the transmission. Several sets of gears are provided in such a transmission which can be switched in and out by means of clutches to obtain different transmission ratios.

With such a transmission the input torque is therefore split between the satellite shafts so that wear is distributed over several parts. Furthermore such splitting of load allows the forces within the transmission frequently to be balanced against each other.

In order to compensate for manufacturing tolerances in the gears it has been found necessary to mount the central shaft so that it floats. Thus limited radial movement of this central shaft is possible when the transmission is shifted to allow the various gears to come into mesh with one another and to compensate for poor manufacturing tolerances.

As a result of this type of construction using a floating central shaft it is impossible to employ standard synchromesh clutches for the various shifting operations, as such clutches require exact alignment of the various gears and shafts they act on. For this reason cruder jaw-type clutches are used which allow limited radial displacement of the clutched parts relative to each other. The obvious result of this type of construction is that shifting with such a transmission must be done with extreme care to prevent clashing of the gears.

Another disadvantage of such a system is that it is necessary to provide at least one pair of gears for each transmission speed. Thus the size of such a transmission, as well as the cost, remains elevated.

OBJECTS OF THE INVENTION

It is therefore an object of the present invention to provide an improved load-splitting transmission.

Another object is to provide such a transmission which can be produced at relatively low cost and which will be of compact size.

A further object is to provide such a transmission which is so constructed that it allows the use of synchromesh clutches for the shifting operation.

SUMMARY OF THE INVENTION

These objects are attained according to the instant invention in a transmission of the above-described general type, but wherein the central and outer shafts are radially fixed relative to each other and are interconnected by a plurality of sets of gears each including a central gear on the central shaft and two respective outer gears on the outer shafts. According to this invention one or both of the outer shafts is constituted as a tube shaft, a core shaft in the tube shaft, and a means rotationally interconnecting the core and tube shafts and permitting limited relative twisting of the core and tube shafts remote from this means. Thus in accordance with the invention at least one of the outer gears, preferably that outer gear which is in the force-transmission path for all speeds, can move angularly relative to the other outer gears. For this reason it is not necessary to mount the central shaft so that it floats and synchromesh clutches can be used for shifting. Furthermore load splitting is effected in every low-torque gear so that overall wear is reduced and it is possible to use light-duty components where normally such usage would be impossible.

Finally with the system according to the instant invention it is possible to build the transmission very small. In fact using as will be described hereinbelow five sets of gears, by which is meant one gear on the central shaft and normally one gear on each of the outer shafts meshing with the central-shaft gear, it is possible to obtain eight forward speeds and two reverse speeds. Such a transmission need only have four clutches each of which can link either of two gears to the respective shaft. Thus extreme simplicity is achieved, while at the same time all of the advantages of a high-quality load-splitting transmission are obtained.

According to further features of this invention most of the gears of each of the outer shafts are carried on the respective tube shaft. At least one gear of each outer shaft, however, is carried on the respective core shaft, and this one gear is part of that set of gears which takes part at all high-torque transmission ratios in the force transmission from the input to the output of the transmission. Thus at any transmission ratio there will be the possibility of some relative angular displacement between the gears on a given one of the outer shafts so that clashing of gears, either due to misalignment or poor manufacturing tolerances, can be compensated for.

According to yet another features of this invention at least some of the gears are mounted on the respective shafts by joints which permit limited angular displacement of the gears relative to the shafts. This can be achieved by fitting springs or spring-steel members between the gears and their shafts, braced angularly so as to permit limited angular displacement. Such mounting does not, however, permit relative radial displacement of the gears and shafts to each other.

According to this invention several sets of gears are provided, each set including a central gear on the central shaft and at least one gear on each of the outer shafts. For reverse a further idler gear is provided in at least one of the sets so that initial force transmission from the input or drive gear fixed on the central shaft can be reversed before splitting of the load. Clutches are provided both on the central and outer shafts, each clutch capable of angularly coupling one or more of the respective gears to the respective shafts. At the same time each of these clutches can be left in a central position in which it allows the respective gear or gears to rotate freely on the respective shaft. For this reason a central gear, for instance, which at a particular speed ratio is locked to the central shaft to transmit force to one or both of the outer shafts can in another speed ratio be an idler gear and serve merely for force transmission or equalization between the two outer shafts, or even for load adding if necessary. Two of the sets of gears are controlled by a single clutch and are set up as a fast set and a slow set, so that moving of the clutch from one end position to the other can give two different speeds with a mechanically simple shifting. Also according to this invention the slow set of gears can be the set carried on the core or torsion shaft so that large transmission ratios can be obtained.

According to the instant invention the central shaft has an input end and an output end rotatable relative to the input end. This is achieved by forming one end of the transmission shaft at least partially as a tube or hollow shaft, and journaling the other part of the transmission shaft in this hollow part. This allows, once again, the overall transmission size and, therefore, the fabrication costs thereof to be reduced.

SPECIFIC DESCRIPTION

Figure 1:
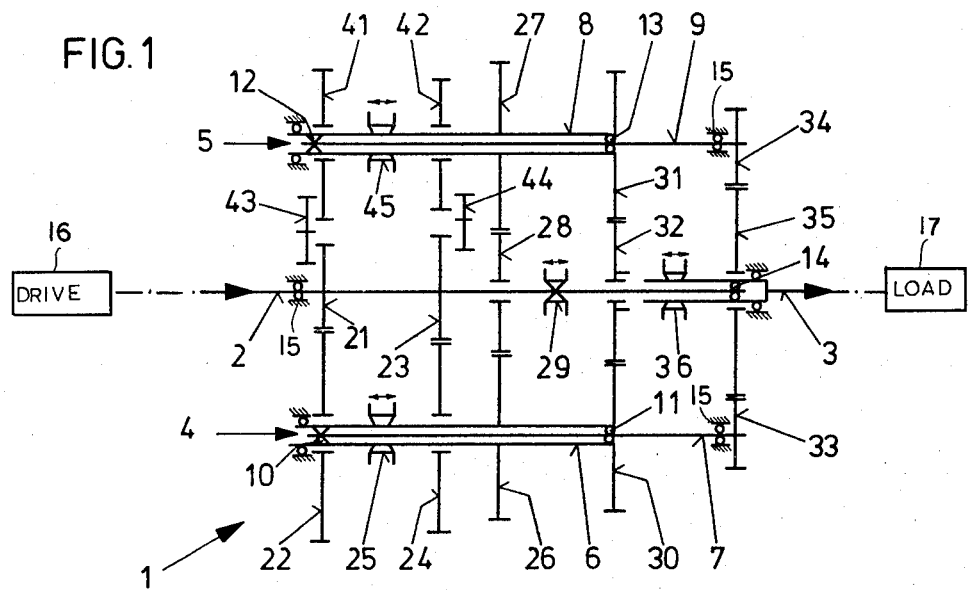
FIG. 1 is a schematic diagram showing the transmission according to this invention.

A transmission 1 as shown in FIG. 1 has a housing 15 provided with a central shaft 2 having an output end 3, and a pair of outer shafts 4 and 5. Roller bearings mount the shafts and shaft assemblies 2–5 in the housing 15 without freedom of radial movement.

According to this invention the one outer shaft assembly 4 is formed by an outer tube shaft 6 in which is received an inner core shaft 7, with a bearing 11 provided between one end of the tube shaft 6 and the core shaft 7 and gear teeth 10 provided at the other end for rotationally linking them together. Similarly the shaft assembly 5 has a tube shaft 8 receiving a core shaft 9, with a bearing 13 at one end and teeth 12 at the other end. The central shaft 2 is journaled at a bearing 14 in the output end of this shaft, so that the parts 2 and 3 can rotate relative to each other about the central axis of the assembly.

According to this invention the input or central shaft 2 is fixed to a pair of drive gears 21 and 23 meshing continuously with respective gears 22 and 24 carried on the tube shaft 6 and angularly securable thereto by means of a synchromesh clutch 25. In addition the gears 21 and 23 mesh with respective reverse idler gears 43 and 44 in turn meshing with reverse gears 41 and 42 carried on the tube shaft 8 and securable thereto by means of a synchromesh shift element 45 identical to the element 25.

The central shaft 2 further carries a gear 28 meshing on one side with the gear 26 fixed to the tube shaft 6 and on the other side with the gear 27 fixed to the tube shaft 8. Another gear 32 carried on the shaft 2 adjacent the gear 28 is of somewhat larger diameter and meshes with gears 30 and 31 on the tube shafts 6 and 8, respectively. A synchromesh clutch 29 can be moved in one direction to lock the gear 28 angularly to the shaft 2 and in the opposite direction to link the gear 32 rotationally to the shaft 2, whereas like the shift elements 25 and 45 when in the central position it links neither of the respective gears to the respective shaft.

The core shafts 7 and 9 carry on their output ends respective gears 33 and 34 meshing with a central gear 35 carried on the output end or tube part 3 of the central shaft. A synchromesh clutch 36 is provided between the gears 32 and 35 and can be moved toward the input end to link the gear 32 to the output shaft 3 and in the opposite direction to link the gear 35 to the output shaft 3.

A drive 16 in the form of an automotive-vehicle engine is normally connected to the shaft 2 through the motor-vehicle clutch and a load 17, normally the vehicle wheels connected through the differential, is connected to the shaft 3. An appropriate shift mechanism is connected to the four synchromesh clutches 25, 29, 36 and 45.

Figure 3:
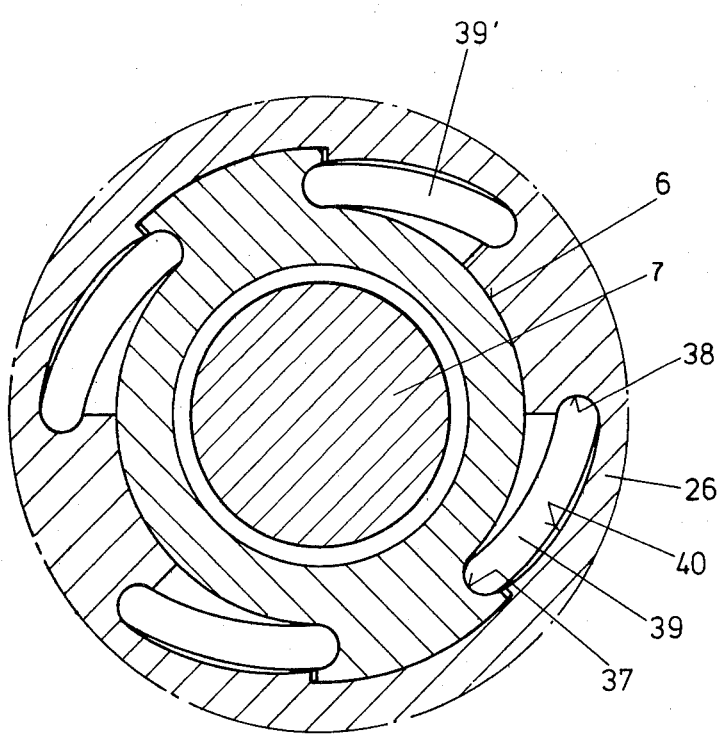
FIG. 3 is a large-scale cross-section through a detail of FIG. 1.

As shown in FIG. 3 the gear 26 mounted on the tube shaft 6 can move angularly limitedly relative to this shaft 6. To this end the shaft 6 is formed with angularly opening pockets 37 that confront pockets 38 formed in the gear 26 so that leaf-spring members 39 and 39' can be received between these two. Angular compression of these members 39 and 39' will bow them outwardly to bring them into contact with surfaces 40 of the gear 26 to limit the relative angular displacement. Similar mounting is provided for the gears 27, 30 and 31.

Thus with the system according to the instant invention limited angular displacement is possible between the various gears on the same shaft. Thus when the transmission ratio is changed during shifting a clashing of gears as a result of misalignment or poor manufacturing tolerances can easily be avoided. This means that the shaft 2 can be fixably mounted in the housing 15 and that synchromesh clutches can be employed for the shifting. Such a system therefore makes shifting greatly easier, eliminating double clutching and thereby making operation of the transmission considerably simpler.

Figure 2:
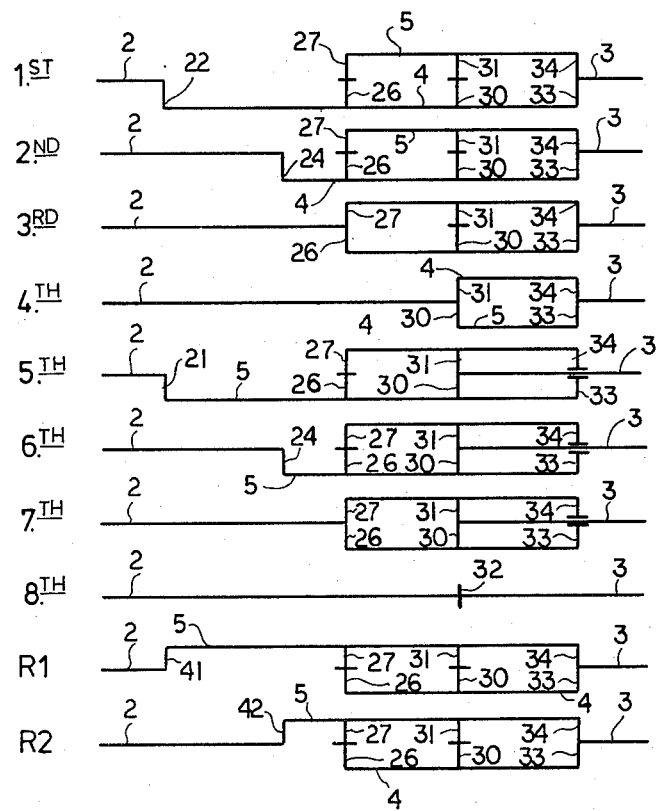
FIG. 2 is another schematic diagram illustrating the force-transmission path through the transmission at the different speed ratios thereof.

FIG. 2 illustrates the force-transmission path for load splitting and load adding in accordance with the instant invention. As can be seen the transmission 1 has eight gears or speeds and two reverse ranges. This is all achieved in accordance with the invention in a transmission having basically five sets of gears, with the two upstream sets being alternately usable for reverse and forward travel.

Below is given a breakdown of the operation of the transmission in each of the speeds or gears, to supplement the diagrams of FIG. 2.

FIRST GEAR

Gear 22 locked on tube shaft 6 and gear 35 locked on output shaft 3.

Input from shaft 2 and gears 21 and 22 to tube shaft 6. Load splitting—

| Tube shaft 6 | |
|---|---|
| Gear 26 | Gear 30 |
| Gear 28 | Gear 32 |
| Gear 27 | Gear 31 |
| Tube shaft 8 | |

| Load adding-- | |
|---|---|
| Tube shaft 6 | Tube shaft 8 |
| Gear teeth 10 | Gear teeth 12 |
| Core shaft 7 | Core shaft 9 |
| Gears 33, 35 | Gears 34, 35 |
| Output shaft 3 | |

SECOND GEAR

Gear 24 locked on tube shaft 6 and gear 35 locked on output shaft 3.

Input from shaft 2 and gears 23 and 24 to tube shaft 6.
Further force transmission as for First Gear.

THIRD GEAR

Gear 28 locked on input shaft 2 and gear 35 locked on output shaft 3.

Input from shaft 2 directly to gear 28. Load splitting—

| Gear 28 | |
|---|---|
| Gear 26 | Gear 27 |
| Tube shaft 6 | Tube shaft 8 |
| Gear 30 | Gear 31 |
| Gear 32 | |

Load adding as for First and Second.

FOURTH GEAR

Gear 32 locked on input shaft 2 and gear 35 locked on output shaft 3.

Input from shaft 2 directly to gear 32. Load splitting—

| | Gear 32 | |
|---|---|---|
| Gear 30 | | Gear 31 |
| Gear 26 | Gear 28 | Gear 27 |
| Tube shaft 6 | | Tube shaft 8 |

Load adding as for First, Second, and Third.

FIFTH GEAR

Gear 22 locked on tube shaft 6 and gear 32 locked on output shaft 3.

Input as for First. Load splitting—

| Tube shaft 6 | |
|---|---|
| Gear 26 | Gear teeth 10 |
| Gear 27 | Core shaft 7 |
| Gear 28 | Gears 33, 35, and 34 |
| | Core shaft 9 |
| | Gear teeth 12 |
| Tube shaft 8 | |

Load adding—

| Tube shaft 6 | Tube shaft 8 |
|---|---|
| Gear 30 | Gear 31 |
| | Gear 32 |
| | Output shaft 3 |

SIXTH GEAR

Gear 24 locked on tube shaft 6 and gear 32 locked on output shaft 3.

Input as for Second.
Load splitting as for Fifth.
Load adding as for Fifth.

SEVENTH GEAR

Gear 28 locked on input shaft 2 and gear 32 locked on output shaft 3.

Input from shaft 2 directly to gear 28. Load splitting—

| Gear 28 | |
|---|---|
| Gear 26 | Gear 27 |

| Tube shaft 6 | Tube shaft 8 |
|---|---|

Load adding as for Fifth and Sixth.

EIGHTH GEAR

Gear 32 is locked directly to the input shaft 2 and to the output shaft 3 for a straight-through 1:1 connection.
Load splitting—none.
Load adding—none.

LOW REVERSE (R1)

Gear 41 is locked to tube shaft 8 and gear 35 is locked to output shaft 3.

Input from shaft 2 through gears 21, 43, and 41 to tube shaft 8.

Load splitting as for First and Second.
Load adding as for First, Second, Third, and Fourth.

HIGH REVERSE (R2)

Gear 42 is locked to tube shaft 6 and gear 35 is locked to output shaft 3.

Input from shaft 2 through gears 23, 44, and 42 to tube shaft 8.

Load splitting as for First and Second.
Load adding as for First, Second, Third, and Fourth.

I claim:

1. A load-splitting transmission comprising:
 a central shaft having coaxial and relatively rotatable input and output parts;
 two outer shafts flanking said central shaft, at least one of said outer shafts having a tube shaft, a core shaft in said tube shaft, and means rotationally interconnecting said core and tube shafts and permitting limited relative twisting of said core and tube shafts remote from said means;
 a plurality of sets of gears each including a central gear on said central shaft and two respective outer gears on said outer shafts each meshing continuously with the respective central gear, one of said outer gears of one of said sets being on said tube shaft and one of said outer gears of another of said sets being on said core shaft;
 means for rotationally coupling one of said central gears to said output part, another of said central gears being freely rotatable on said central shaft; and
 means for transmitting torque between said input part and both of said outer shafts, whereby the torque applied to said input end is imparted to both of said outer shafts and then split therebetween by means of said other central gear and is eventually summed by said one central gear and applied to said output part.

2. The transmission defined in claim 1 wherein said means for transmitting torque includes yet another set of gears having a central gear on said central shaft and at least one outer gear on said one outer shaft.

3. The transmission defined in claim 2 wherein both of said outer shafts include a respective such core shaft, a respective such tube shaft, and a respective such means rotationally interconnecting same.

4. The transmission defined in claim 3 wherein said other set of gears of said means for transmitting torque included clutch means for securing the respective outer gear on the respective outer shaft, the respective central gear being fixed on said input part of said central shaft.

5. The transmission defined in claim 3 wherein said other set of gears of said means for transmitting torque includes clutch means for securing the respective central gear on said input part of said central shaft and a pair of such outer gears carried on said outer shafts and both meshing with the respective central gear.

6. The transmission defined in claim 3 wherein the central gear of said one set is larger in diameter than the central gear of said other set.

7. The transmission defined in claim 3, further comprising means for limited rotation between at least one of said outer gears and the respective outer shaft.

8. The transmission defined in claim 7 wherein said means for limited rotation includes at least one spring angularly engaged between the respective outer gear and shaft.

9. The transmission defined in claim 3, further comprising a housing in which said shafts are rotatable and which defines for said shafts relatively fixed rotation axes, and at least one synchromesh clutch between a one of said central gears and said central shaft.

10. The transmission defined in claim 3 wherein said central shaft has a tubular portion defining one of said parts and a core portion defining the other of said parts and journaled in said tubular portion.

* * * * *